(12) United States Patent
Schmohl et al.

(10) Patent No.: US 10,381,903 B2
(45) Date of Patent: Aug. 13, 2019

(54) METHOD FOR PRODUCING A STATOR FOR AN ELECTRIC MOTOR

(71) Applicants: Michael Schmohl, Ammerbuch (DE); Felix Ebner, Göppingen (DE); Enrico Flöte, Frickenhausen-Linsenhofen (DE); Matthias Hiller, Altenriet (DE); Stefan Bauer, Westerheim (DE)

(72) Inventors: Michael Schmohl, Ammerbuch (DE); Felix Ebner, Göppingen (DE); Enrico Flöte, Frickenhausen-Linsenhofen (DE); Matthias Hiller, Altenriet (DE); Stefan Bauer, Westerheim (DE)

(73) Assignee: METABO-ALLEE 1, Nurtingen (DE)

( * ) Notice: Subject to any disclaimer, the term of this patent is extended or adjusted under 35 U.S.C. 154(b) by 576 days.

(21) Appl. No.: 15/062,438

(22) Filed: Mar. 7, 2016

(65) Prior Publication Data
US 2016/0226351 A1 Aug. 4, 2016

Related U.S. Application Data

(63) Continuation-in-part of application No. 13/712,021, filed on Dec. 12, 2012, now abandoned.

(51) Int. Cl.
 *H02K 3/12* (2006.01)
 *H02K 3/18* (2006.01)
 *H02K 15/00* (2006.01)
 *H02K 15/095* (2006.01)

(52) U.S. Cl.
 CPC ........... *H02K 15/0031* (2013.01); *H02K 3/12* (2013.01); *H02K 3/18* (2013.01); *H02K 15/095* (2013.01); *Y10T 29/49009* (2015.01)

(58) Field of Classification Search
 CPC ........ H02K 15/095; H02K 1/148; H02K 3/18; H02K 3/12; H02K 15/0031; Y10T 29/49009
 See application file for complete search history.

(56) References Cited

U.S. PATENT DOCUMENTS

| | | | | |
|---|---|---|---|---|
| 3,251,559 A | * | 5/1966 | Moore | ................. H02K 15/095 242/147 R |
| 5,664,317 A | * | 9/1997 | Ponzio | .................. H02K 3/522 242/432 |
| 8,230,584 B2 | | 7/2012 | Lindenthal et al. | |
| 2011/0115314 A1 | | 5/2011 | Du et al. | |

FOREIGN PATENT DOCUMENTS

JP 2009118676 A 5/2009

OTHER PUBLICATIONS

German Office Action.
Chinese Office Action dated Oct. 8, 2014 and translation.

\* cited by examiner

*Primary Examiner* — Livius R. Cazan
(74) *Attorney, Agent, or Firm* — Randall Danskin P.S.

(57) ABSTRACT

The present invention relates to a method for producing a stator which includes the steps of inserting a stator segment into a former; introducing a coil wire winding into a coil space of the stator segment, and out via a slot which is located in the region between two pole horns; cohesively connecting the turns of the coil at least partially, at least in parts of that region of the coil, which is located outside the slot; and removing the former.

6 Claims, 8 Drawing Sheets

METHOD FOR PRODUCING A STATOR FOR AN ELECTRIC MOTOR

The present invention relates to a method for producing a stator for an electric motor.

Such stators are used in electric drives or electric motors which also comprise a rotor, in addition to a stator. A conventional application of such electric drives is in household appliances and electric machine tools.

A stator of an electric drive or an electric motor with a corresponding rotor generally has a stator body with a closed stator wall and pole horns or pole tips arranged thereon. The rotor of the electric drive is arranged within these pole horns and moves in rotary fashion about an axis of rotation within the stator relative to said stator. The stator body, which is generally produced from iron-containing material (iron), has a coil space which comprises a number of coil slots, which are delimited by the respective pole horns and the stator wall of the stator. Generally, an insulated coil wire or field coils manufactured from such a wire are inserted into these coil slots.

Electric drives with a stator and a rotor arranged therein are generally air-cooled, wherein ambient air is sucked into the electric drive and sucked through this electric drive. The air flowing through the electric drive dissipates the heat from the coil wire and in the process ensures that the electric drive can output sufficient power without overheating.

One disadvantage which has become apparent in practice in connection with the air-cooling of electric drives consists in that dust particles are often contained in the cooling air which can attack the coil wire and thus result in abrasion of the coil wire.

In order to counteract this problem, it is known from practice to wind banding and/or insulating paper around manually inserted, prewound coils prior to the insertion into the coil space. In this case, however, this additional working step of wrapping the prewound coils is extremely complex and therefore both time-consuming and cost-intensive in terms of production. Further disadvantages of manually inserted, prewound coils result from the likewise cost-intensive and time-consuming step of manually inserting the coil into the coil space and from the circumstance by which the coil space can never be utilized completely in the case of manually inserted coils since there is always a small gap remaining between the coil slot and the inserted prewound coil.

Alternatively, the coil space of a stator body is wound directly with coil wire, preferably with the aid of a needle winding machine or the like, since, as a result, an increased packing density of the coil wire in the coil space is achieved and, furthermore, quick winding can take place. In this case, the coil wire is inserted with a space factor of less than 100% of the coil slots.

However, one disadvantage here is that not all of the physical space available can be utilized for forming the coils.

A further disadvantage which has become apparent in the case of known winding methods for directly wound stator bodies results from the method itself. In general, a so-called flyer winding method is used, an electrical coil or winding being produced in said flyer winding method by the wire being supplied by means of a roller or through a nozzle which is located on a "flyer". The flyer or flyer arm rotates at a defined distance from the coil. In the process, the wire is supplied through the shaft of the flyer. For winding purposes, the component which is to be wound has to be fixed in the winding region of the flyer. Since the component which is to be wound does not need to execute any movements during the winding process, it is also possible to produce very irregularly shaped and bulky products. However, winding by means of flyers generally results in a random winding in which the individual wire layers intersect. Therefore, the packing density in the case of stator bodies which are wound in this way is not optimal either.

One object of the present invention therefore consists in providing a compact, robust, high-performance electric motor using an improved production method.

This object is achieved according to the invention by a method having the features of Claim 1. The dependent claims relate to advantageous embodiments and developments of the invention.

An advantageous method for producing a stator as described above comprises the following steps:
  inserting a former into a stator segment;
  introducing the coil wire into the coil space, and wherein the coil wire is wound out via the slot in the region between two pole horns;
  cohesively connecting the turns of the coil at least partially, at least in parts of that region of the coil, and which is located outside the slot; and
  removing the former.

If, for example, the cohesive connection is performed using a baked-enamel wire as coil wire, this can be achieved, for example, by virtue of the fact that the baked-enamel wire is subjected to an electrical current and is heated thereby.

For provisional stabilization of the coil for the subsequent handling steps in the context of the production process, it is sufficient if an electrical current with a current intensity in the range of 30-70 A, and in particular 50 A, is used for a time period of less than about 10 seconds, for example for 3-5 seconds, and in particular 4 seconds. As a result, the clock times can be kept short in the manufacture process. For example, the turns can be brought to a temperature of about 200° C. for about 5 seconds.

In particular for the final cohesive connection of the turns, in addition or as an alternative, an impregnating resin can be used. In this case, the stator body can be immersed in the impregnating resin. The immersion or another way of providing the coil with the impregnating resin can be parallelized. Thus, for example, a large number of stator bodies can be immersed in an impregnating resin bath simultaneously, with the result that the quotient of the curing time of the impregnating resin and the number of simultaneously treated stator heads determines the clock time of this step per manufactured stator head. This provides the advantage over the prior art that the virtually unparallizable step of energizing the baked-enamel wire can be kept short in terms of time.

For example, after the provisional fixing by virtue of heating the turns as described above, the stator bodies can be immersed in an impregnating resin bath at a temperature in the range of 100° C.-140° C., in particular 120° C.

With the aid of the above-described method, it is possible to produce a stator which comprises a stator body with a coil space for accommodating a coil wire in the form of a coil, and wherein the coil space comprises a plurality of slots, which are delimited by a stator wall, and pole horns of the stator. According to the invention, the coil wire is wound out via the slot in the region between two pole horns.

By virtue of the fact that a cohesive connection between the turns of the coil is provided, at least partially, at least in parts of that region of the coil which is located outside the slot, it is possible to achieve the situation in which the coil remains mechanically stable even without the supportive effect of the pole horns.

One advantageous variant of the cohesive connection can be achieved by virtue of the fact that the coil wire is at least partially in the form of baked-enamel wire. A baked-enamel wire is understood to mean a coil wire which has a thermally resistant base insulation and a cover layer which agglutinates on heating and often also polymerizes in the process.

As a result of the fact that 40-60% of the coil wire is arranged outside the slot, the physical space available can be utilized particularly advantageously.

As a result of the fact that the cohesive connection is formed at least partially by an impregnating resin, a particularly permanent mechanical stabilization of the coil can be achieved.

The invention will be explained in more detail below with reference to the drawings.

The attached figures show, by way of example, a preferred embodiment in which the individual features of the invention are combined with one another. However, a person skilled in the art will, of course, also consider these features separately from one another and/or will be able to combine them to form other expedient combinations.

In the drawings, schematically:

Figure 1:
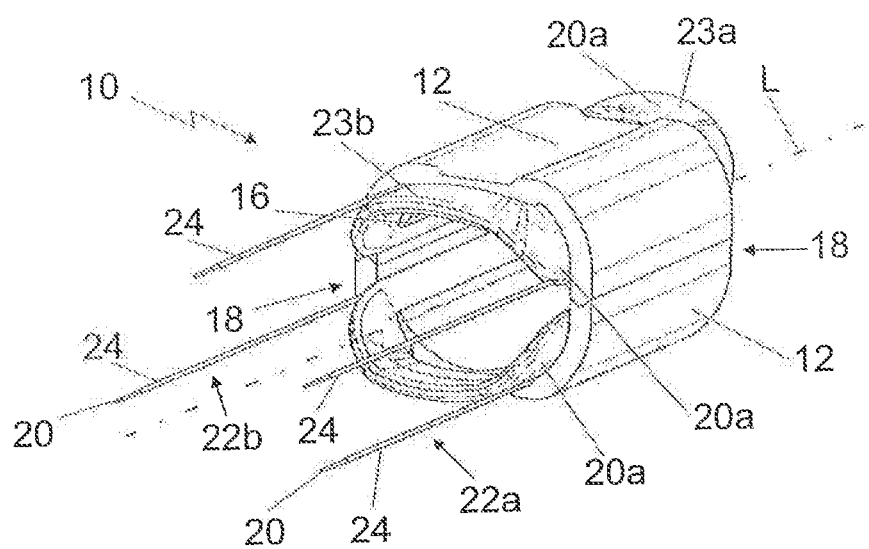
FIG. 1 shows an isometric view of a two-pole stator.

FIG. 1 shows a two-pole stator of an electric drive which is denoted overall by the reference symbol 10. This two-pole stator comprises a stator body, which is divided into two stator segments or stator halves 12 in the region of a partition plane which extends along a longitudinal axis L of the stator. In this case, the two stator halves 12 are formed as identical parts, which makes the production of the stator body particularly simple. Generally, the illustrated stator body of the stator 10 is produced by stamping and stacking identical laminations to form a laminate stack.

Furthermore, each of the stator halves 12 comprises two pole horns or pole tips 16 (cf. also FIG. 2), which extend inwards from the inner circumferential face 12a of the respective stator half 12, and therefore delimit the interior of the stator 10 for a rotor to be accommodated therein (not illustrated).

The two stator halves 12 are connected to one another in the region of two connection points 18, with each stator half 12 having a first connection point 18a, and a second connection point 18b.

Furthermore, end sections or wire ends 22a and 22b of a coil wire 20 which is inserted in the form of a coil, i.e. in the form of a coil 20a with a winding structure and end windings 23a and 23b, are also shown in FIG. 1. As can be seen from FIG. 1, the wire ends 22a, and 22b, as connecting wires, are each provided with heat-shrink tubing 24 as a tube element, which heat shrink tubing does not end or extend outside the stator 10, but is pushed into the stator 10, i.e. protrudes into the winding structure of the coil 20a, in order to achieve optimum insulation and to provide protection against conductive deposits. Suitable tube elements also include glass-fabric tubes.

In other exemplary embodiments, a sleeve element could also be provided instead of the tube element.

Figure 2:
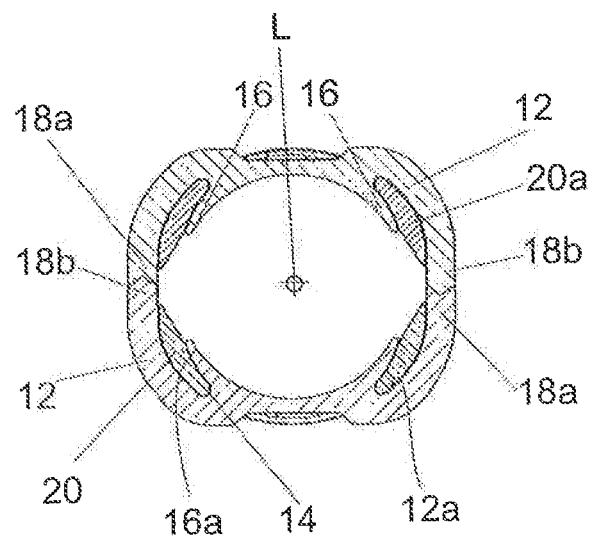
FIG. 2 shows a cross sectional view which is perpendicular to the longitudinal axis of the stator shown in FIG. 1.

As can clearly be seen from FIG. 2, the first connection point 18a of the two stator halves 12 is formed in each case by a triangular slot 18a which runs or extends along, and parallel to, the longitudinal axis L, while the second connection point 18b is formed by a corresponding triangular projection 18b which runs or extends along, and parallel to, the longitudinal axis L. Owing to the special formation of the first and second connection points 18a and 18b, simple production of the connection points 18 can be made possible.

Furthermore, by virtue of the shape of the first and second connection points 18a and 18b, an alignment of the stator halves 12 with respect to one another is achieved if the respectively corresponding first connection point 18a, and the second connection point 18b are brought to rest against one another. Finally, this special configuration of the connection points 18 can mean that the stator halves 12 can be stamped out of the material when resting directly against one another during production of the stator body, which results in less waste being accumulated in comparison with the prior art.

FIG. 2 likewise clearly shows that the stator inner wall 12a, and the radially outer wall 16a of the pole horns 16, delimits or defines a slot 14, into which the coil wire 20, which is produced from copper, can be accommodated or received. As can be seen from the figures (cf. in particular FIGS. 2 and 3), the coil wire 20, in the form of a coil 20a, is inserted into the coil space which is formed by the slots 14 in a stator half 12.

FIG. 2 also illustrates that the inserted coil wire 20 is not inserted into the slot 14 with a space factor of less than 100%, as is conventional in the prior art, but rather is wound out via the slot 14. This can be considered to be a particularly novel feature of the present invention since, by virtue of a space factor of more than 100%, an increased power of an electric motor with a stator 10 wound in this way can be achieved in comparison with an electric motor with a conventionally wound stator. In particular, the winding form shown in FIG. 2 makes it possible to arrange, in total, more coil turns in a hollow-cylindrical volume element (which is located between the stator halves and the outer side of an armature) than is possible in accordance with the prior art teachings. Given the same amount of physical space taken up, an increased magnetic flux can thus, overall, be produced with the coil 20a, and therefore a higher power of the electric motor can be achieved. Likewise, for a given number of turns, the coil 20a can have a considerably flatter design than was previously possible in accordance with the prior art, with the result that, given the same turns number, an armature with a greater diameter can be used. This results in increased torque on the armature windings in comparison with the prior art, which likewise results in an increase in amount of power which is generated. Likewise, given the same power, a reduction in size of the electric motor and therefore a reduction in the thread measure of an associated electric hand tool can be achieved.

Since the mechanically stabilizing effect of the pole horns 16 is no longer present in the region emerging via the slot 14, additional measures are required for ensuring that the coil retains its shape and the windings do not detach from one another.

For this purpose, an at least partially cohesive connection of the turns of the coil 20a, with respect to one another, at least in parts of that region of the coil 20a which is located outside the slot 14, is advantageous. This cohesive connection can be implemented, for example, using a baked-enamel wire. A baked-enamel wire is understood to mean a coil wire which has a thermally resistant base insulation and a cover layer which agglutinates upon heating, and often also polymerizes in the process. In addition, or as an alternative, the cohesive connection can also be provided by means of an impregnating resin, which virtually completely penetrates the coil 20a after immersion owing to the capillary effect of the interspaces between the turns in the coil 20a.

Figure 3:
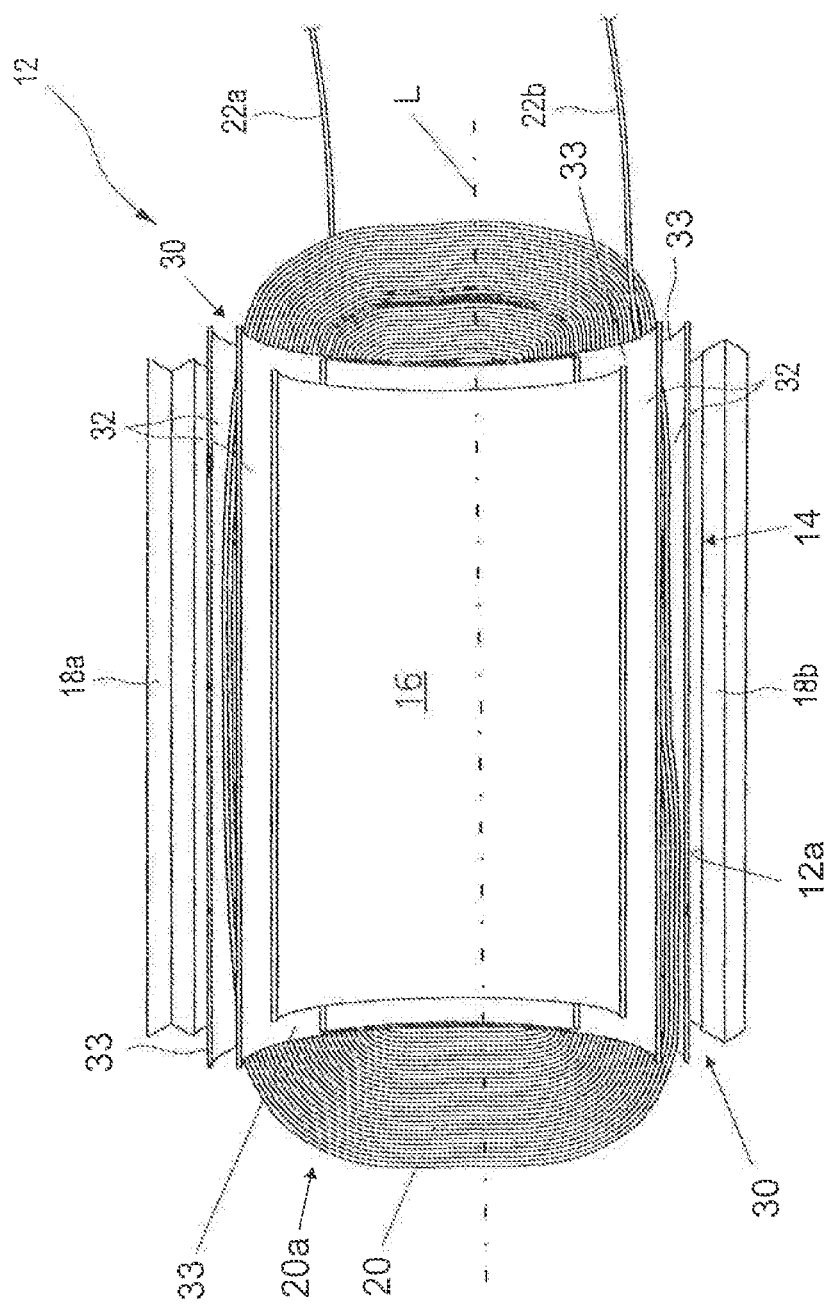
FIG. 3 shows a plan view of a stator half of the stator as shown in FIGS. 1 and 2.

As is shown in FIG. 3, the two-pole stator 10 with its two stator halves 12 comprises, not only a stator body formed by the stator halves 12, which stator body is wound with coil wire 20, but also insulating paper 30, which is inserted into the slots 14, before the coil wire 20 is wound onto the respective stator half 12.

The insulating paper 30 serves the purpose of protecting the coil 20a which is formed by the coil wire 20 from abrasion during operation of an electric motor having the stator 10, and of electrically insulating said coil from the stator body and the adjacent rotor (not illustrated). Thus, a minimum air gap of 2 mm between an active part, such as the stator body or the rotor, and the coil wire needs to be provided in order to ensure electrical insulation in accordance with the standard DIN EN 60745. This is ensured in the case of the abovementioned space factor of the coil wire 20 of over 100% by virtue of the fact that the insulating paper 30 is provided with a radial overhang 32 (cf. also FIG. 4) beyond the respective pole horns 16.

A radial overhang 32 is understood to mean that part of the insulating paper 30 which overhangs radially, with respect to the longitudinal axis L, i.e. in a direction perpendicular to the longitudinal axis L, and beyond the pole horns 16.

Figure 4:
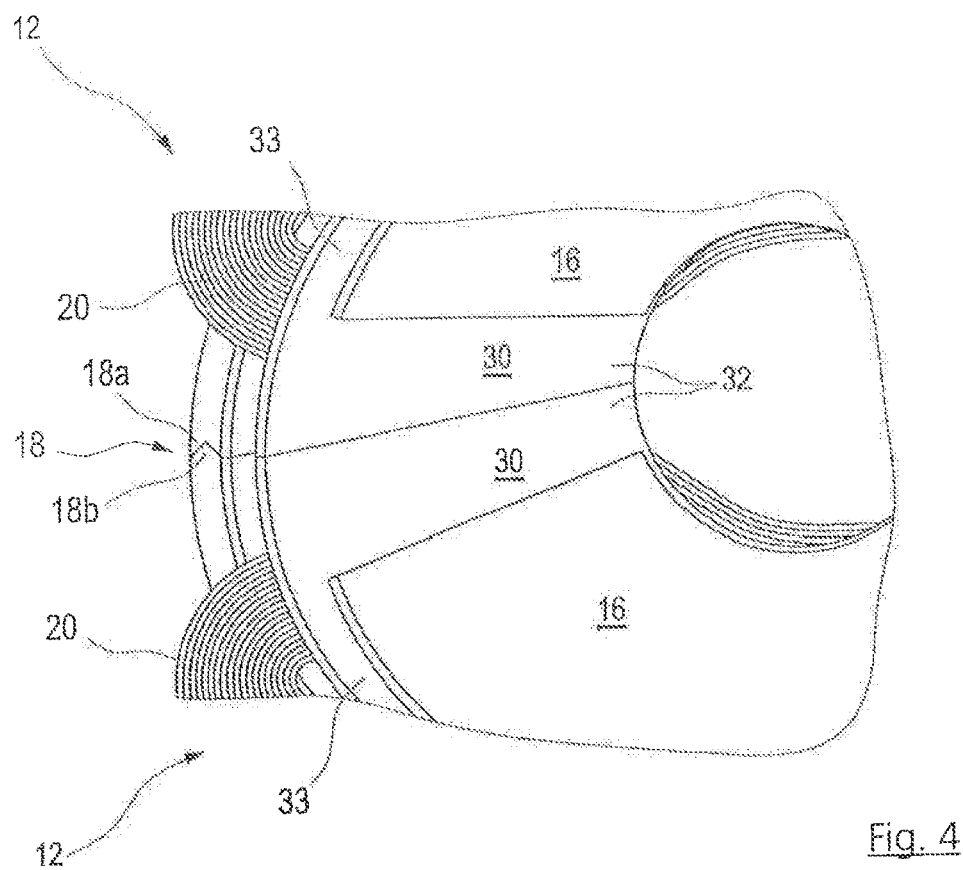
FIG. 4 shows a detailed view of a connection point of a stator as shown in FIGS. 1 and 2.

In this case, the overhang 32 of the insulating paper 30, as shown in FIG. 4, can be selected such that at least the radially inner sections of the overhanging insulating paper 32 rest against one another when the stator halves 12 are assembled, i.e. in the region of their connection points 18, and the overhangs 32 of the insulating paper 30 of the two stator halves 12 likewise rest against one another or overlap one another. In addition, as can be seen from FIG. 3, an axial (in relation to the longitudinal axis L of the stator 10) overhang 33 of the insulating paper 30 can also be expedient in order to ensure the electrical safety gap of an air gap of 2 mm between the coil wire and the active iron. The axial overhang 33 is understood to mean that part of the insulating paper 30 which overhangs beyond the pole horns 16, and axially in relation to the longitudinal axis L, i.e. in a direction parallel to the longitudinal axis L.

Figure 5A:
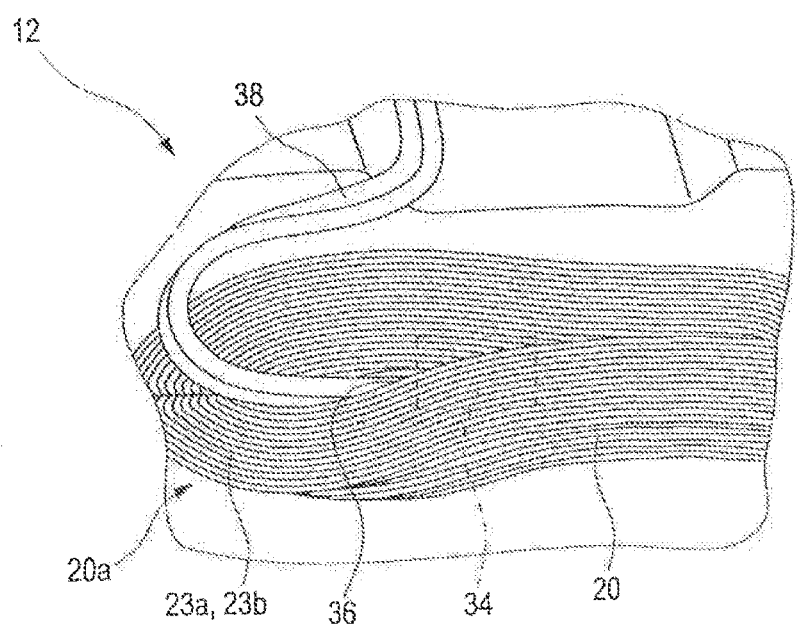
FIG. 5a shows a detailed view of a stator half with a temperature sensor element in a first embodiment.
Figure 5B:
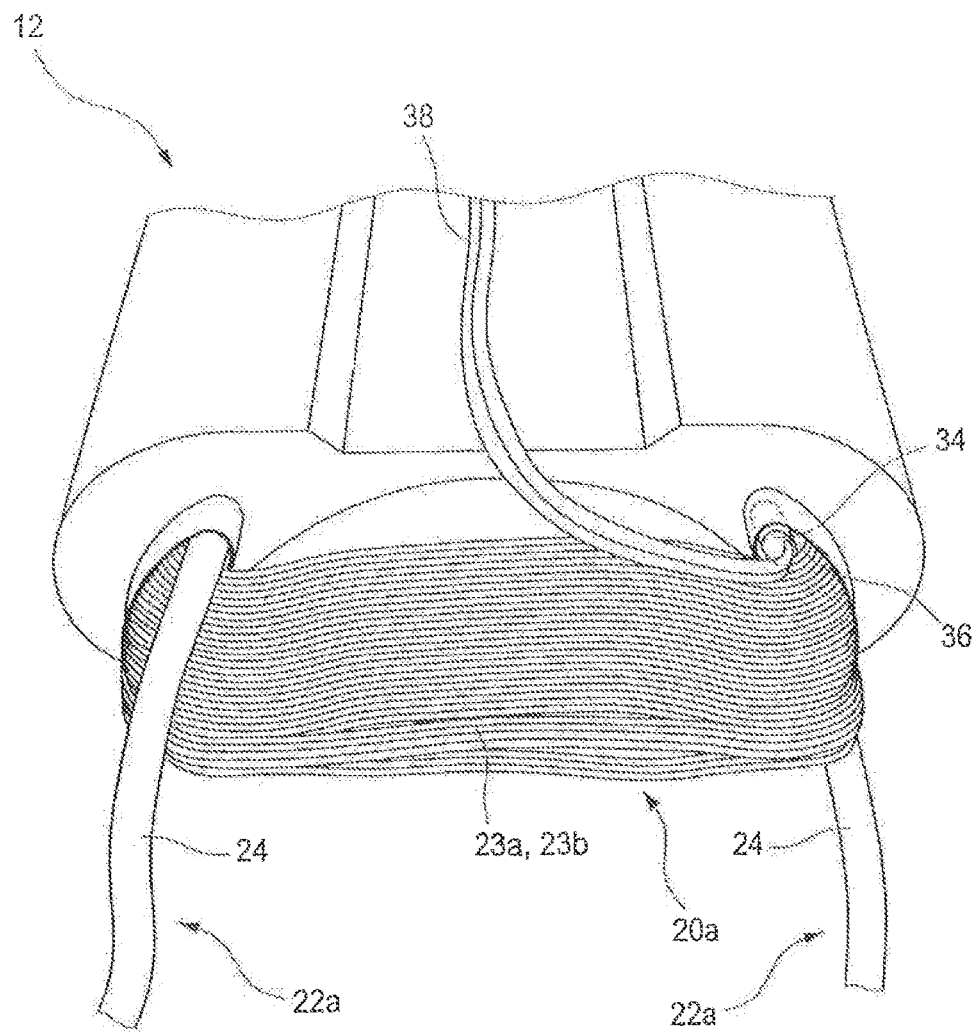
FIG. 5b shows a detailed view of a stator half with a temperature sensor element in a second embodiment.

As can be seen from FIG. 5a, a temperature sensor element 34 and which is indicated by dashed lines, is provided in a cutout or a cavity 36 in the winding structure of the coil 20a in order to detect the temperature of the coil 20a or the coil wire 20 during operation. The temperature sensor element 34 is at least approximately completely surrounded by the coil 20a, with the result that, in FIG. 5a, only the connecting lines 38 protrude out of the coil. The temperature sensor element 34 can be introduced only into one, or else into both, stator halves 12. As can be seen from FIG. 5b, the temperature sensor element 34 can, alternatively, also be accommodated in a cavity 36 in at least one of the coil slots 14. For this purpose, the temperature sensor element 34 can be arranged between the coil 20a, on one side and the stator wall, and/or one of the pole horns 16, on the other side.

A further special and novel feature of the present invention can be considered to be the fact that the two wire ends, or wire end sections 22a, and 22b, and which are produced during the winding operation by the coil 20a, at the stator halves 12, can be used as connecting wires or electrical connections of the electric motor, as mentioned, above. For this purpose, the wire ends 22a, and 22b are passed out of the coil 20a with a sufficiently long length in order to perform the function of separate litz wires known from the prior art, and to further enable a connection of the coil 20a to a current source, or a distribution board (not shown). Separate connecting elements, for example in the form of a crimping claw (not illustrated), can be fastened at the free ends of the wire end sections 22a, and 22b in such a way that said connecting elements penetrate the insulating outer layer (in the example illustrated an insulating base layer, and a baked-enamel layer applied thereon) of the coil wire 20, and enable electrical contact to be made with the coil. The connecting elements (not illustrated) can also have an outer geometry shaped in the manner of a plug, which can be plugged into a corresponding plug-type connector at the current source or the distribution board of the electric drive.

The production process of a two-pole stator will now be described, below, with reference to the figures which are provided.

In a first step, the two stator halves 12 which are intended to be wound with copper wire in a further process step are stamped, while resting against one another, out of a laminate stack produced by stamping and stacking of identical laminations.

In another step, in order to ensure sufficient electrical insulation during operation, and to be able to provide sufficiently large gaps between the coil and active parts of the electric motor, insulating paper 30 is inserted into the slots 14 in the respective stator halves 12 before the stator halves 12 are wound.

In still another step, in order to ensure that the insulating paper 30 is fixed relative to the respective stator half 12, with the insulating paper 30 being inserted into the slot 14 in said stator half, the stator halves 12, in a previous process step, and prior to the insertion of the insulating paper 30 into the associated slots 14, can be heated at least in the region of the slots, for example to a temperature of at least 150° Celsius. In this previous process step the insulating paper 30 is coated, at least sectionally, with a baked enamel on that side with which it is intended to come to rest against the heated slot 14 of the stator halves 12. In another step the inserted insulating paper 30 can then be pressed against the slot inner sides for a few seconds as soon as said insulating paper is inserted into the associated slot 14. In this process step the baked-enamel coating fuses to the insulating paper 30 and adhesively bonds said insulating paper to the stator half 12. In the present methodology, it is therefore no longer necessary for the insulating paper 30 to be fixed during the subsequent process step of the winding.

As earlier discussed, the inserted insulating paper 30, in this case, has a radial overhang 32 beyond the pole tips 16 of the respective stator halves 12. This overhang 32 can additionally be drawn radially inwards during the subsequent winding operation in order to ensure, during the winding operation, that the insulating paper 30 is not bent by the coil wire 20.

In a further processing step, each of the stator halves 12 is wound with the coil wire 20 in an automated fashion. Unlike the known winding methods which includes the use of a flyer, in the present methodology the wire is supplied in a still manner and, instead, the stator half to be wound is moved relative to said wire. In this way, it is possible to successfully prevent a random winding with intersecting wire turns being established on the stator half. Instead, a layer winding in which the wire turns do not intersect but rather are wound one on the other in successive layers. As a result, the air gaps in the winding can be reduced, and a higher fill factor can be achieved. This again results in greater efficiency of the stator. Furthermore, the dissipation of heat from the winding can also be improved.

Unlike in the case of known winding methods in which the coil is prewound and then inserted into the stator body (for example manually inserted or inserted by machine), so called, "pressing and shaping" of the winding, which are typical of prewound coils, are dispensed with by the winding process in addition to producing a layer winding for the purpose of saving costs. The design of the winding, which is important for the installation, and the subsequent establishment of the electrical safety clearances according to known standards is governed automatically by the design of the formers which implement the present methodology.

Figure 6:
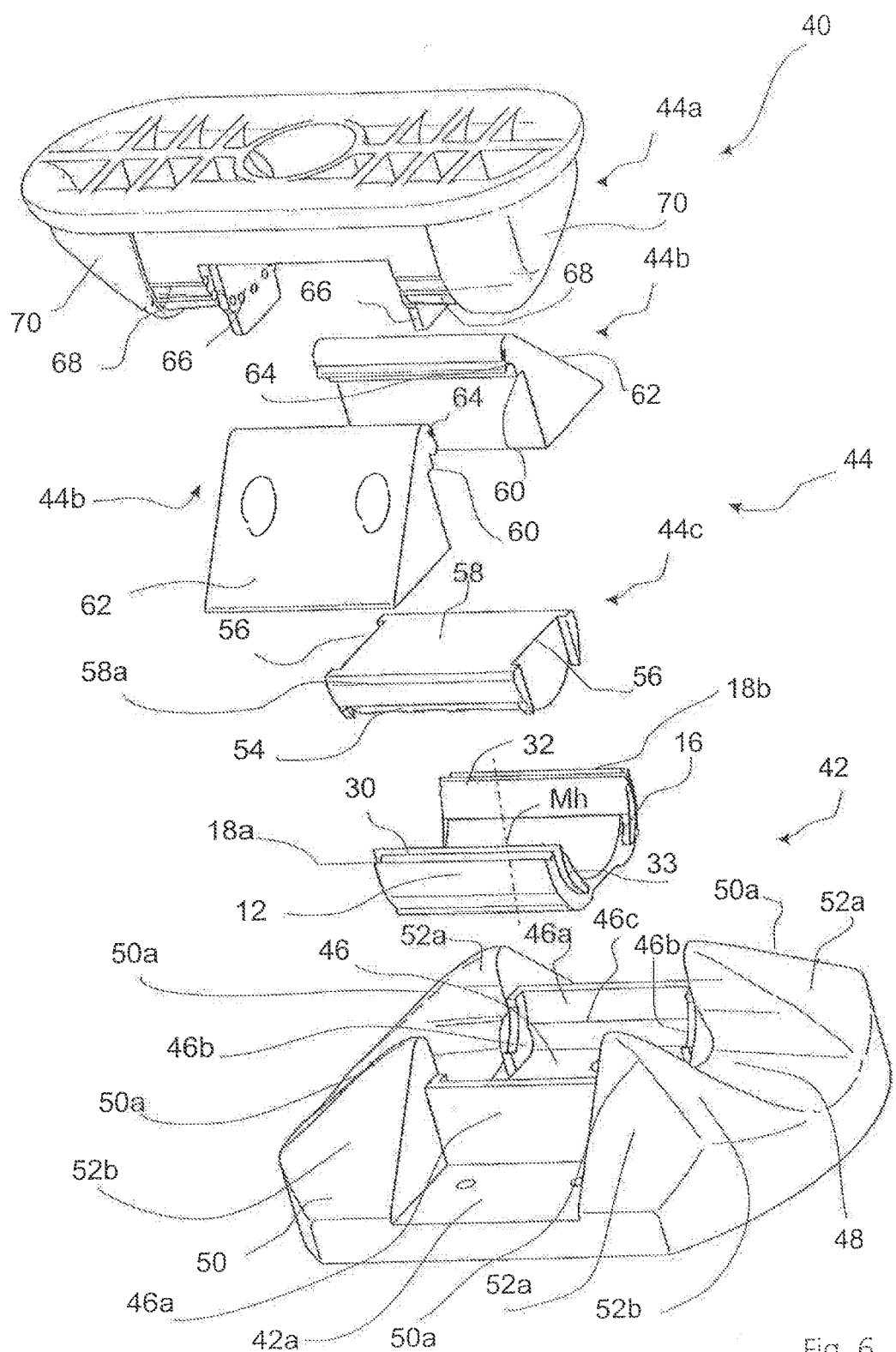
FIG. 6 shows a former which can be used in a winding operation of a stator according to the invention.
Figure 7A:
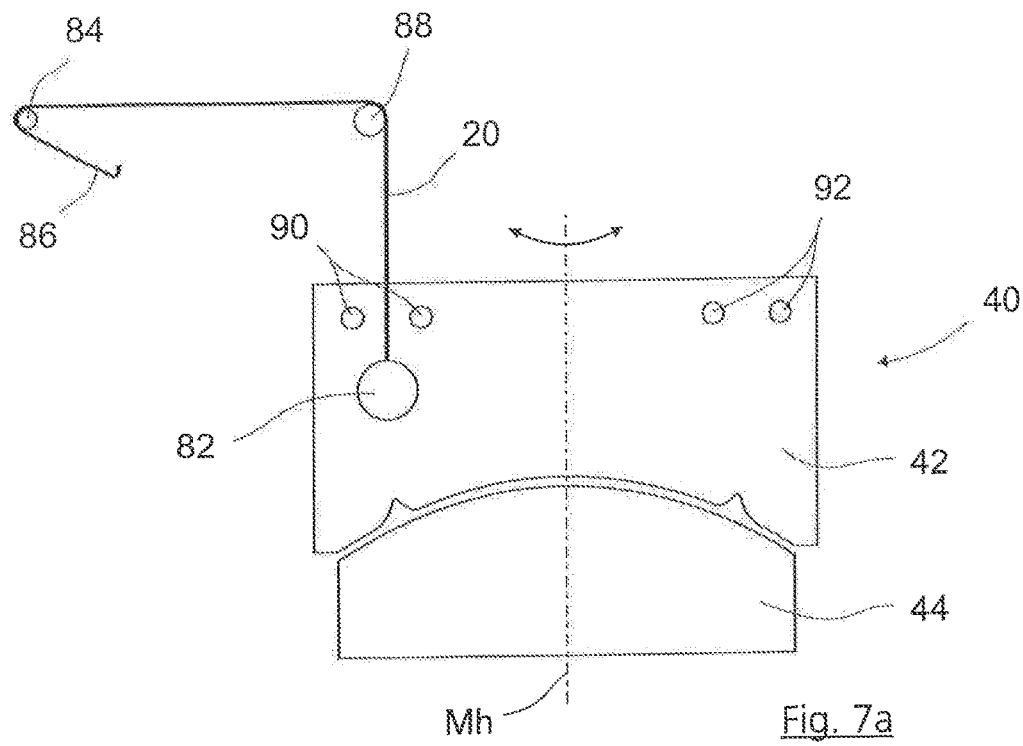
FIG. 7a shows a very simplified illustration of the winding arrangement comprising the former during winding in a top view.
Figure 7B:
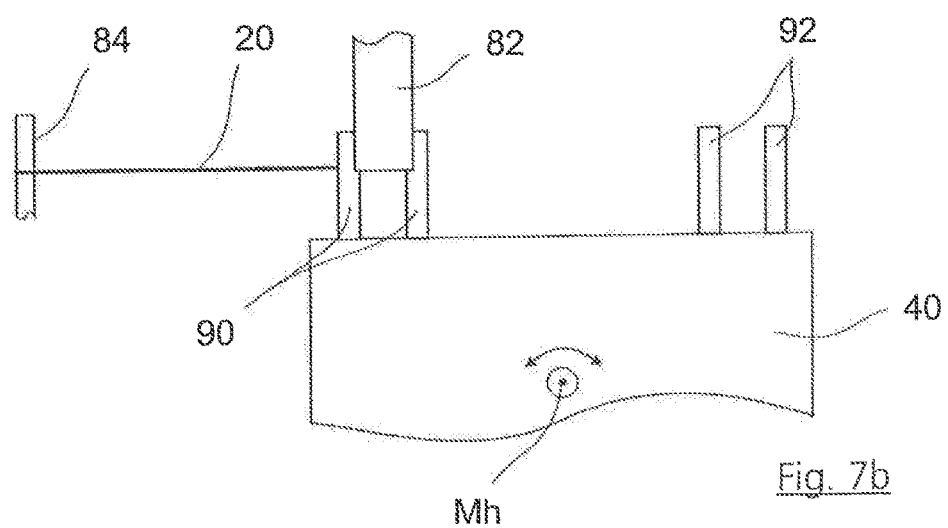
FIG. 7b shows a very simplified illustration of the winding arrangement comprising the former during winding in a side elevation view.

FIGS. 7a and 7b show in a very simplified illustration the design of the winding arrangement. In particular, the former 40 is shown in a very simplified manner. A concrete design of the former according to one exemplary embodiment of the invention is shown in FIG. 6.

In the current methodology, and in yet another step, the coil wire is supplied by means of a wire supply which is in the form of a tube 82 for example. The coil wire 20 is guided by means of the tube 82, in another step, to a tensioning element 84, for example, in the form of a tensioning pin 84, and which engages an end section of the free end 86 of the wire in order to tension the coil wire as explained below. In another step, the tube 82 is then moved to its supply position in which it remains throughout the entire winding process while the stator half 12 which is to be wound is rotated relative to said tube about a central vertical axis Mh (perpendicular to the longitudinal axis L). To this end, the tensioned coil wire 20 can run guided by one or more return pulleys 88 to a wire inlet 90 provided at the former 40, where in another step it is wound onto the stator segment and the stator half 12, respectively, when the former 40 rotates about its rotational axis Mh. The coil wire is guided out of the former 40 by way of the wire outlet 92.

In order to ensure that the coil wire is not cut by the sharp edges of the stator half 12, which is to be wound, during the winding process and in order to achieve winding of the stator halves 12 in which the fill factor of the coil slot 14 is above 100%, a former 40, as illustrated in FIG. 6, is used in another step.

The former 40 substantially comprises an accommodation device 42, and a core 44. As can clearly be seen from FIG. 6, the core 44 has a plurality of components, specifically a first core part 44a, two holding-down means 44b, and a second core part 44c.

The accommodation device 42 comprises a base plate 42a, from which an accommodation means 46, and four ramp-like projections 50 extend. The accommodation means 46, which is bounded by the side walls 46a, 46b, corresponds substantially to the outer contour of the stator half 12 which is to be accommodated. The side walls 46b have a cutout for forming the end windings 23a, 23b. Furthermore, lateral resting faces 46c which rest against the outer circumferential face of an accommodated stator half 12 are provided in the cutout.

The projections 50 have guide faces 52a, and 52b which abut one another at a respective tensioning edge 50a. The tensioning edges 50a can have a small radius in order to not excessively stress the coil wire, which slides over the tensioning edge 50a, and the baked-enamel coating of said coil wire.

As already indicated above, in one step of the methodology, it is not the wire supply but rather the stator half 12 which is to be wound that is rotated about its central vertical axis Mh for winding purposes. To this end, the stator half 12 is accommodated in the former 40, during another step, during the winding process and is accordingly rotated with said former. In this step, the coil wire 20 is brought to rest against the respectively facing guide face 52a, 52b and the tensioning edge 50a by virtue of the rotation of the former 40 and is prestressed by means of the latter, before it slips over the respective projection 50 and jumps or moves into the coil slot 14 of the accommodated stator half 12.

Owing to the tension or stress which is built up in the coil wire, said coil wire is drawn in another step, into the coil slot 14 and therefore tightly wound in layers. Since it is not the wire supply in the form of the tube 82 but rather the former 40 with the stator half 12 which is to be wound that is rotated, a random winding can be avoided in spite of a high winding speed. Therefore, the specific design of the former 40 provides a simple and cost-effective winding method in which a packing density and a high space factor of the directly wound coil can be achieved at a higher winding speed.

Further guide surfaces 70 in the region of the end windings of the coil which are to be formed are formed on the first core part 44a, and in another step engage into an accommodation contour 48 of the accommodation device 42 for the end windings when the core 44 is rested against an accommodated stator half. In addition, the two holding-down means 44b have guide faces 62 which are in alignment with the guide faces 52a, and 52b and along the longitudinal axis L of the stator half 12 when the core 44 is rested against an accommodated stator half.

As mentioned above, the core 44 is made up of a plurality of parts of which the functioning and manner of operation will be explained below. The first core part 44a has a central accommodation means for the second core part 44c which is bounded by the side walls 66. The second core part 44c has two guide slots 56 in which the side walls 66 can be accommodated when the first and the second core part 44a and 44c are intended to be connected to one another. A defined position displacement of the two core parts 44a and 44c relative to one another is possible owing to the guide slots 56.

This physical arrangement is desirable in order to effect another step in the methodology which includes laterally clamping the radially inner overhang 32 of the insulating paper 30, which is inserted into the coil slots and projects radially beyond said coil slots, between the first core part 44*a* and the second core part 44*c,* and in this way to prevent said insulating paper from being able to be bent by the coil wire during the winding process. To this end, the second core part 44*c,* in another step, is inserted into the stator half 12, first. In a further step, the first core part 44*a* is pushed onto the second core part 44*c,* and wherein the radially inner overhang 32 can be rested against the tensioning face 58, and can further be clamped in between the core parts 44*a* and 44*c* with the aid of corresponding radii or phases (the phase 58*a* is shown only on the second core part 44*c*) on the first core part 44*a,* and on the second core part 44*c.*

Furthermore, the first core part 44*a,* in still another step, includes bounding the outer faces 68 in the region of the end windings which are to be formed, said outer faces forming boundary faces for an intermediate space between the core 44, and the accommodation device 42. These outer faces 68 cannot be arcuate as viewed in cross section, but rather can be designed in the form of a string of polygons, as a result of which a plurality of parallel edges are produced on the resting face 68. In this methodology, the bounding outer faces of the first core part are preferably coated, in still another step, with a metallic material or are produced from a metallic material. As an alternative, as can be seen in FIG. 3, metallic contact faces 68*a* which are formed in the manner of pins in the shown illustration are formed on the bounding outer faces 68 of the first core part 44*a,* in still another step.

Both of the aforementioned steps lead to the effective contact faces of the first core part 44*a* (in the region of the end windings) on the coil 20*a* being reduced, and as a result of which more uniform heating and dissipation of heat at the end windings can be achieved. Therefore, the effective metallic contact faces, which ensure improved dissipation of heat, can be arranged in precisely those regions in which temperature peaks, and therefore undesired irregularities can be avoided during the heating of the coil.

The effect, as noted above, can possibly be intensified by corresponding metallic contact faces or a profiling (with a contour which is in the form of a string of polygons as viewed in cross section) also being provided on the accommodation device 42 in the region of its accommodation contour 48 for the end windings, in another step.

Finally, the holding-down means 44*b* serves, in another step, to engage over the stator half 12, and in the region of its connection points 18*a,* and 18*b,* and to fix said stator half laterally in position in the accommodation device 42. For this purpose, and in another step, the holding-down means 44*b* have, in the region of their shoulders 60, a contour which corresponds to the contour of the first connection point 18*a,* or to the second connection point 18*b.* Furthermore, the holding-down means 44 can provide a slot entry funnel for the coil wire together with the rest of the core.

Finally, slot-like cutouts 64 for accommodating the radial outer overhang 32 of the insulating paper 30 are also provided on the holding-down means 44*b,* said cutouts likewise serving, in another step, to keep the radial overhang 32 of the insulating paper away from the coil slot 14 in order to prevent the insulating paper 30 from being bent by the coil wire during the winding process.

Before this former is removed, again, in order to apply further manufacturing steps to the stator body, the coil 20*a* is at least partially baked or "initially baked" in another step. For this reason, in the present production process, a baked-enamel wire is used as coil wire 20, i.e. a copper wire with a thermally resistant base insulation, and an additional, baked-enamel cover layer, which softens at temperatures of approximately 150° C. to 200° C., and further hardens, with the result that the individual coil turns of the coil 20*a* are held together in a combined structure, at least for the subsequent handling steps, during manufacture by the cured baked enamel. In order to heat the baked enamel correspondingly, and in yet another step, current is introduced into the coil 20*a,* with the result that the coil is heated to the desired temperature (approximately 150° C. to 200° C.) as a result of its electrical resistance. For preliminary stabilization of the coil 20*a,* a current flow of approximately 50 A for a time period of approximately 4 seconds is sufficient. As a result the manufacturing time can be kept short. In this method step, in which the individual wire turns are baked to form a coil 20*a,* the overhang 32 of the insulating paper 30 can also be baked onto the coil 20*a.* In this step, the insulating paper 30 can likewise have a baked-enamel coating at least in the region of its overhang 32 on the side facing the coil 20*a* for this purpose.

Alternatively, however, it is likewise conceivable for the insulating paper, in another step, to be baked directly onto the baked-enamel coating of the coil wire or with the aid of a coating means to be applied separately on the coil in still another step. Furthermore, it is also conceivable for another coating means or another cover layer to be used as a baked enamel for fixing the coil turns to one another.

A spacer element (not illustrated), and in particular a pin or the like, can, in another step, be inserted into the region of the coil space in such a way that, when the coil wire 20 is inserted in automated fashion into the coil space, the cavity 36 which is delimited or defined by the spacer element in the winding structure of the coil 20*a* or in at least one of the coil slots 14, results. Once the spacer element has been removed from the winding structure of the coil 20*a,* or from the at least one coil slot 14, the temperature sensor element 34 can be inserted into the remaining cavity 36 in yet another step.

The former 40 is designed, for example, in such a way that the corresponding cutout or the cavity 36 remains in a region of the wound coil 20*a,* and into which cavity the temperature sensor element 34 can be inserted into the wound coil 20*a,* in a further processing step. Alternatively, the spacer element which is separate from the former can be used. The temperature sensor element 34, in another step, is fixed in the at least one cavity 36 of the coil 20*a.* This can take place by means of the fixing means of the coil wire 20. Alternatively, however, it is likewise conceivable for the temperature sensor element 34 to be baked, in still another step directly to the baked-enamel coating of the coil wire 20, or to be fixed to the coil 20*a* with the aid of an additional sensor fixing means to be applied, separately. For this purpose, the temperature sensor element 34 can be coated, at least partially, with the sensor fixing means. The spacer element, and therefore also the cavity 36, can be provided in the region of the end winding 23*a,* and *b* or in one of the coil slots 14, and between the coil 20*a,* on one side, and the stator wall and/or one of the pole horns 16, on the other side. The additional sensor fixing means can comprise, for example, adhesive, impregnating resin or a baked enamel.

Furthermore, an abovementioned spacer element can be inserted during another step into the region of the coil space in such a way that, during automated insertion of the coil wire 20 into the coil space, a cavity (not illustrated) which is delimited or defined by the spacer element, results in the region of the end sections 22*a,* and 22*b* in the winding structure of the coil 20*a.* Once the spacer element has been removed from the winding structure of the coil 20*a,* the heat shrink tubing 24 can be applied to the respective wire end 22*a,* and 22*b* and introduced into the remaining cavity in the winding structure of the coil 20a. Then the heat shrink tubing 24 is fixed into the winding structure of the coil 20a by means of a tube fixing means. The tube fixing means can comprise adhesive or impregnating resin, preferably a dual-curing resin.

Finally, the connecting elements can be fastened, in another step, at the free ends of the wire end sections 22a, and 22b, and wherein the connecting elements preferably not only act on the wire end sections 22a, and 22b but, in the fastened state, also pass through the heat shrink tubing 24 in order to provide optimum insulation and protective effect for protecting the wire end sections 22a, and 22b respectively.

Once the two stator halves 12 have been produced, and wound in this way, the stator halves are connected to one another in order to jointly form the stator body. For this purpose, the two stator halves 12 are rested against one another in the region of their connection points 18, with the first connection point 18a of one stator half 12 being brought to rest against a second connection point 18b of the respective other stator half 12.

The two stator halves 12, once resting against one another, can then be fixed to one another, in a further step, by means of immersion impregnation. For this step, the two stator halves 12 resting against one another or the wound-up coil 20a can be heated and immersed in an immersion bath, and in particular in a bath which includes a dual-curing resin (impregnating resin or dual resin), which cures both under the effect of heat, and under the effect of UV light. Owing to the capillary effect of the interspaces between the individual turns of the coil 20a, the impregnating resin largely passes through this coil. As a result of the fact that the coil 20a is heated, the resin on the coil 20a, and in particular also in the interior of the coil 20a, and between the turns, can cure as early as during the immersion process. As a result the entire coil 20a can be mechanically stabilized to the extent that it withstands the mechanical loading during its later use. In the outer regions of the stator 10, which do not have the same temperature as the coil 20a, the resin can be cured in a further step by means of applying UV light when using a dual resin.

The aforementioned step of immersion impregnation serves not only as additional protection for the entire stator body against abrasion, but also as a stator fixing means for the cohesive connection of the stator halves 12 with respect to one another. In principle, however, it is also conceivable for the two stator halves to be connected to one another cohesively, in another step, for example, by means of adhesive bonding, welding or soldering or the like, prior to the immersion impregnation step. In this case, it is conceivable both to only apply individual fixing points and to provide a connection seam along the connection points 18 in order to hold the stator halves in their relative position with respect to one another during the immersion impregnation.

The stator fixing means, i.e. in the described case the dual resin, can also act as tube fixing means or as sensor fixing means in another step.

The above-described immersion impregnation step is extremely advantageous since it enables the coating of the coil, and the stator body, and the fixing of the stator halves to one another in a single processing step. Furthermore, owing to the immersion impregnation used, it is ensured that the stator forms an overall system which is both electrically optimally insulated per se, and is also protected against abrasion. The above-described partial baking or initial baking of the coil turns can be performed by the combination with the further process step of the immersion impregnation within a time window of approximately 3 seconds since, as a result, the turns of the coil only need to be secured relative to one another to the degree that the former can be removed. The immersion impregnation step which is performed in a further process step, ensures the sufficient stability of the coil during operation of the electric drive. If it were desirable for the coil to only be fixed by baking of the baked-enamel coating of the coil wire, increased baking times in the winding machine would be necessary, which would increase the overall manufacturing time during production in a disadvantageous manner.

Figure 8:
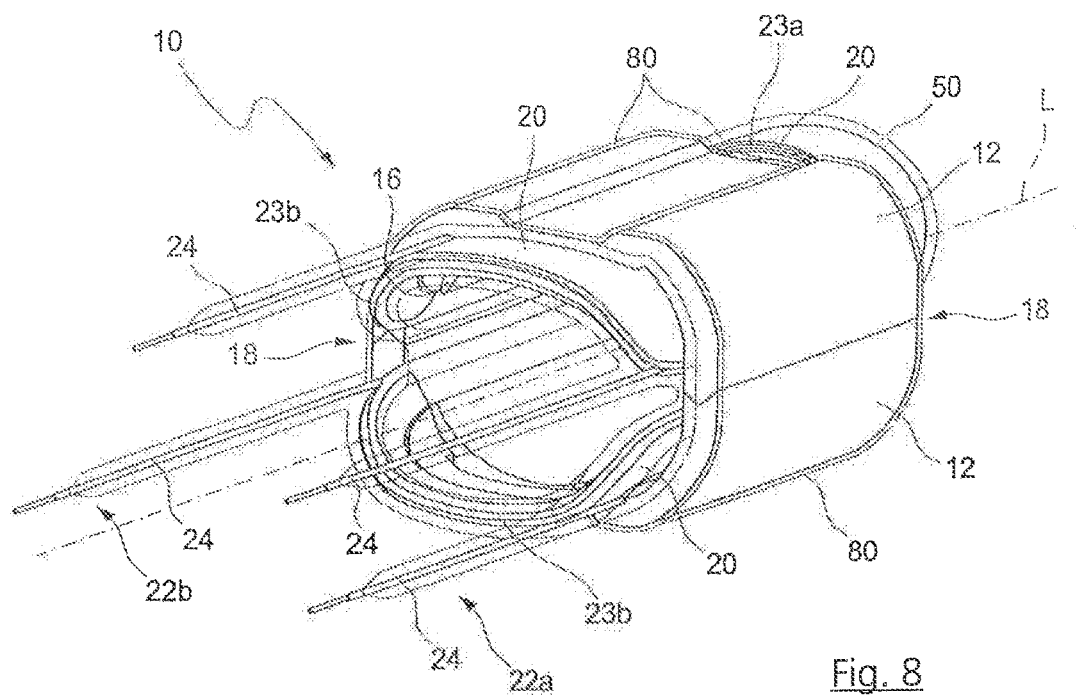
FIG. 8 shows an isometric view of a stator provided with a coating.
Figure 9:
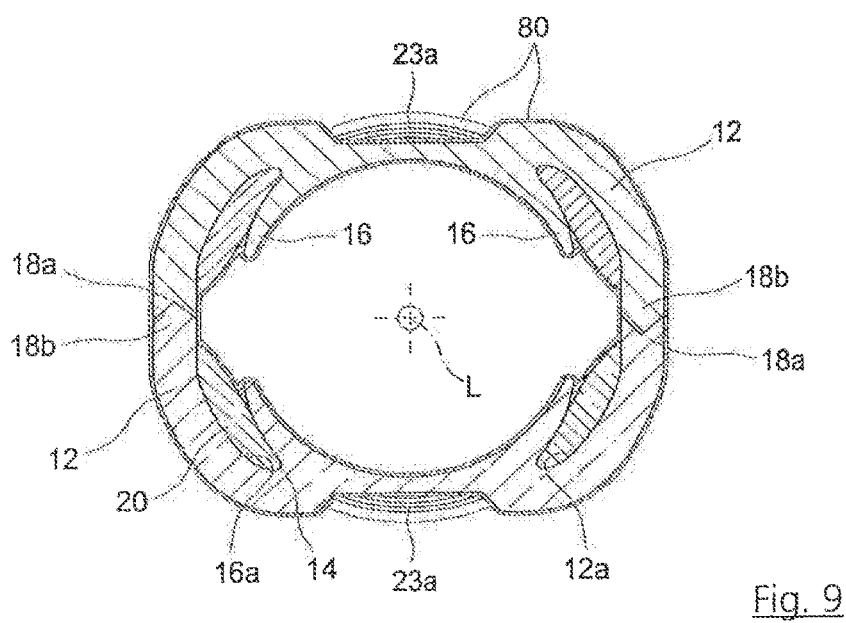
FIG. 9 shows a sectional illustration of the stator as previously shown in FIG. 8.
Figure 10:
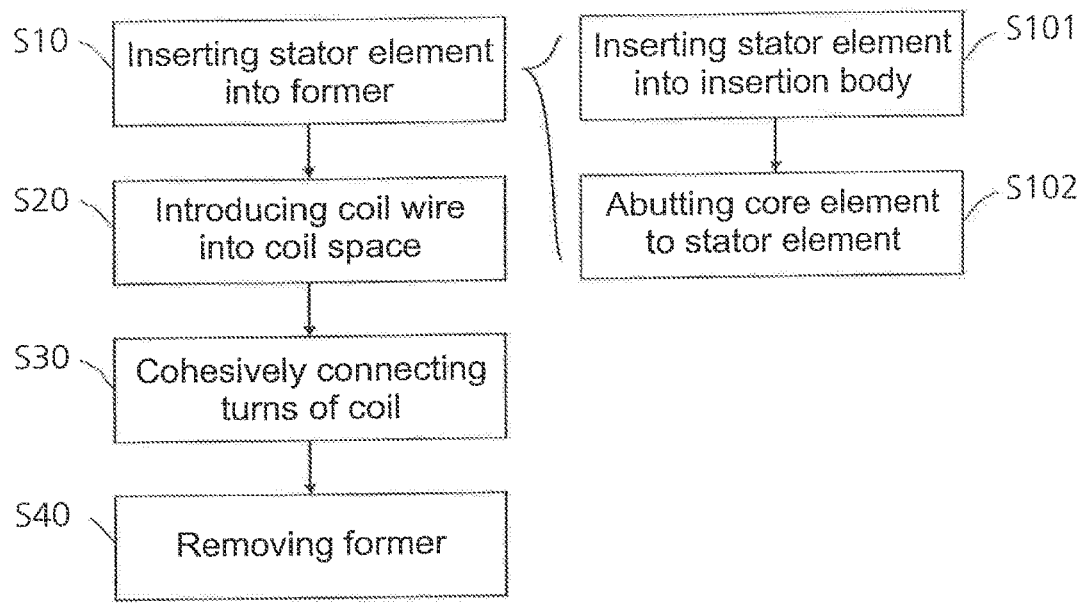
FIG. 10 shows a flowchart of the method for processing a stator according to the present invention.

FIGS. 8 and 9 show a stator 10 which has been coated by means of immersion impregnation as described above. In principle, other coating methods for producing the coated stator 10, such as by spraying, for example, are also conceivable. The reference symbols used in FIGS. 8 and 9 largely correspond to those which are used already, in FIGS. 1 and 2.

FIG. 8 shows, in an isometric view, a stator 10, in which the end windings 23a and 23b have been provided with the common coating 50. It can clearly be seen from FIG. 8 that the common coating 50, in the exemplary embodiment shown here, covers the stator body on its inner and outer side and the end windings 23a and 23b as well as the wire ends 22a, and 22b which are provided with the heat shrink tubing 24. Therefore, in the present exemplary embodiment, a continuous coating 50 is formed over the entire stator 10, in the aforementioned steps, and this coating effectively protects all of the components and, owing to its design as a common coating, does not form any hard shoulders or transitions at which abrasively acting particles in the air flowing past could attack.

FIG. 9 shows, in a sectional view which is taken perpendicular to the axis L, the profile of the coating 50. It can clearly be seen from FIG. 9 that the coating 50 is slightly thinner in the region of the stator body than in the region of the end windings 23a. The thicker coating in the region of the end windings 23a is in particular also advantageous because the end windings are generally subjected to the greatest extent to an abrasively acting flow of particles in the cooling air.

The stator 10 shown in FIGS. 8 and 9 can subsequently be inserted into a motor housing (not shown).

The invention claimed is:

1. A method for producing a stator, comprising:
providing at least two stator segments that are connectable to one another to form a stator body, and wherein each of the at least two stator segments defines a longitudinal axis and two pole horns which extend inwardly from an inner circumferential surface of each respective stator segment and which delimit an interior surface of the stator body to accommodate a rotor therein, and each of the at least two stator segments has two spaced apart connection points to provide an interconnection with a second stator segment of the at least two stator segments to form the stator body and each of the at least two stator segments defines a coil space for accommodating a coil wire in the form of a coil, and wherein the coil space defines a slot;
providing an insulating paper, and fixing the insulating paper within the slot defined by the coil space in each of the at least two stator segments and allowing edge portions of the insulating paper to project outwardly from the slot defined by the coil space in each of the at least two stator segments;

providing a former having an accommodation device, and a core, the accommodation device having a base plate, sidewalls and four ramp-like projections that extend from the base plate, and the sidewalls substantially correspond to an outer contour of each respective stator segment and the sidewalls of the accommodation device each define a cut-out for forming end windings of the coil, and the ramp-like projections define guide faces which abut one another at tensioning edges and each of the tensioning edges defines a radius to reduce stress on the coil wire as the coil wire passes over the tensioning edge, and the core has a first core part, two holding down means and a second core part;

inserting one of the at least two stator segments into the former;

clamping the outwardly projecting edges of the insulating paper between the first core part and the second core part to prevent the insulating paper from bending during winding of the coil;

rotating the former carrying the inserted one of the at least two stator segments while introducing the coil wire into the coil space defined by the inserted stator segment and being rotated with the former to form the coil, and wherein the coil wire forming the coil is wound out of the slot in the region between the two pole horns, filling the coil slot more than 100%;

cohesively connecting, at least partially, windings of the coil in portions of the coil which are outside the slot; and removing the inserted stator segment from the former.

2. A method according to claim 1, and wherein during the step of introducing the coil wire into the coil space, the coil wire is brought to rest against the former, and wherein the former has at least two tensioning edges along which the coil wire slides, and against which said coil wire is pre-stressed during the introduction process, before the coil wire slips over the tensioning edge into the coil space of the stator segment.

3. A method according to claim 1, and wherein during the step of inserting the stator segment into the former, the stator segment is first inserted into the accommodation device, and then the core is brought to rest against the inserted stator segment.

4. A method according to claim 1, and wherein the former accommodation device, and/or the former core have metallic contact faces in a region proximate to the end windings of the coil that is formed.

5. A method according to claim 1, and wherein the accommodation device tensioning edges are each formed on the ramp-like projections which protrude from the base plate of the accommodation device, and rise in the direction of the inserted stator segment which is to be wound.

6. A method according to claim 1, and wherein the core of the former comprises at least two holding-down means.

* * * * *

UNITED STATES PATENT AND TRADEMARK OFFICE
CERTIFICATE OF CORRECTION

PATENT NO. : 10,381,903 B2
APPLICATION NO. : 15/062438
DATED : August 13, 2019
INVENTOR(S) : Michael Schmohl et al.

Page 1 of 1

It is certified that error appears in the above-identified patent and that said Letters Patent is hereby corrected as shown below:

On the Title Page

Item (73) Delete "METABO-ALLEE 1, Nurtingen (DE)" Insert -- Metabowerke GmbH, Nürtingen (DE) --

In the Specification

Column 1: Line 28: Insert a -- , -- after disadvantage

Column 1: Line 29: Insert a -- , -- after drives

Signed and Sealed this
Fourteenth Day of April, 2020

Andrei Iancu
*Director of the United States Patent and Trademark Office*